(12) United States Patent
Zuo et al.

(10) Patent No.: US 7,729,730 B2
(45) Date of Patent: Jun. 1, 2010

(54) SLIDE MECHANISM FOR A SLIDE-TYPE PORTABLE TERMINAL DEVICE

(75) Inventors: Zhou-Quan Zuo, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1015 days.

(21) Appl. No.: 11/473,259

(22) Filed: Jun. 21, 2006

(65) Prior Publication Data

US 2007/0058328 A1 Mar. 15, 2007

(30) Foreign Application Priority Data

Sep. 9, 2005 (CN) .................. 2005 1 0037205

(51) Int. Cl.
*H04M 1/00* (2006.01)
(52) U.S. Cl. ............................... 455/575.1; 455/575.4

(58) Field of Classification Search .................. None
See application file for complete search history.

(56) References Cited

U.S. PATENT DOCUMENTS

| | | | |
|---|---|---|---|
| 6,782,242 B1* | 8/2004 | Koleda et al. | 455/90.3 |
| 6,822,871 B2* | 11/2004 | Lee et al. | 361/727 |
| 7,136,688 B2* | 11/2006 | Jung et al. | 455/575.4 |
| 7,149,559 B2* | 12/2006 | Qin et al. | 455/575.8 |
| 2005/0009572 A1* | 1/2005 | Ahn et al. | 455/566 |
| 2005/0009582 A1* | 1/2005 | Vooi-Kia et al. | 455/575.4 |
| 2006/0079301 A1* | 4/2006 | Kim et al. | 455/575.3 |
| 2006/0276237 A1* | 12/2006 | Lee | 455/575.4 |

FOREIGN PATENT DOCUMENTS

| | | |
|---|---|---|
| CN | 1472584 A | 2/2004 |
| CN | 1526586 A | 9/2004 |

* cited by examiner

*Primary Examiner*—Ajit Patel
(74) *Attorney, Agent, or Firm*—Jeffrey T. Knapp

(57) ABSTRACT

A slide mechanism includes a rack gear (10), a bracket (20), a cam assembly (30), and an elastic member (10). The cam assembly is rotatably mounted on the bracket. The cam assembly includes a pinion gear (322). The pinion gear engages with the rack gear. The elastic member is secured on the bracket for providing an elastic force to the pinion gear.

16 Claims, 7 Drawing Sheets

SLIDE MECHANISM FOR A SLIDE-TYPE PORTABLE TERMINAL DEVICE

TECHNICAL FIELD

The present invention relates to slide mechanisms, and in particular to a slide mechanism for a slide-type portable terminal device which constitutes a first housing and a second housing slidably coupled to each other.

BACKGROUND

Currently, among diverse portable terminal designs, a slide type portable terminal device has been increasingly used. The slide type portable terminal is configured to have two housings. One of the housings slides over the other housing, thereby opening/closing the portable terminal device.

One related slide type portable terminal device comprises a first housing with a display portion and a speaker portion, and a second housing with a display portion slidably mounted on the first housing. A slide mechanism is installed between the first housing and the second housing for slidably opening and closing the first housing. The second housing slides in a longitudinal direction along the first housing thereby covering or exposing the upper surface of the first housing. The slide mechanism described in the above has a guide groove formed at lateral surfaces of the second housing in a longitudinal direction, and a guide rail formed at an edge of the first housing and inserted into the guide groove to be moved in a longitudinal direction.

The guide groove and the guide rail are opened when a user manually pushes the first housing in a forward longitudinal direction and are closed when the user manually pushes the first housing in a rearward longitudinal direction.

However, in the above-described slide type portable terminal device, the user is inconvenienced by having to manually open and close the guide groove and the guide rail by pushing the second housing in a forward longitudinal direction or a rearward longitudinal direction.

What is needed, therefore, is a slide mechanism which overcomes the above-described shortcomings.

SUMMARY

In one embodiment thereof, a slide mechanism is provided. The slide mechanism comprises a rack gear, a bracket, a cam assembly, and an elastic member. The cam assembly is rotatably mounted on the bracket. The cam assembly includes a pinion gear. The pinion gear engages with the rack gear. The elastic member is secured on the bracket for providing an elastic force to the pinion gear.

Other advantages and novel features of the preferred embodiments of the present hinge system and its applications will become more apparent from the following detailed description when taken in conjunction with the accompanying drawings.

BRIEF DESCRIPTION OF THE DRAWINGS

Many aspects of the present slide mechanisms and their applications can be better understood with reference to the following drawings. The components in the drawings are not necessarily drawn to scale, the emphasis instead being placed upon clearly illustrating the principles of the slide mechanisms. Moreover, in the drawings, like reference numerals designate corresponding parts throughout the several views.

DETAILED DESCRIPTION OF PREFERRED EMBODIMENTS

Figure 1:
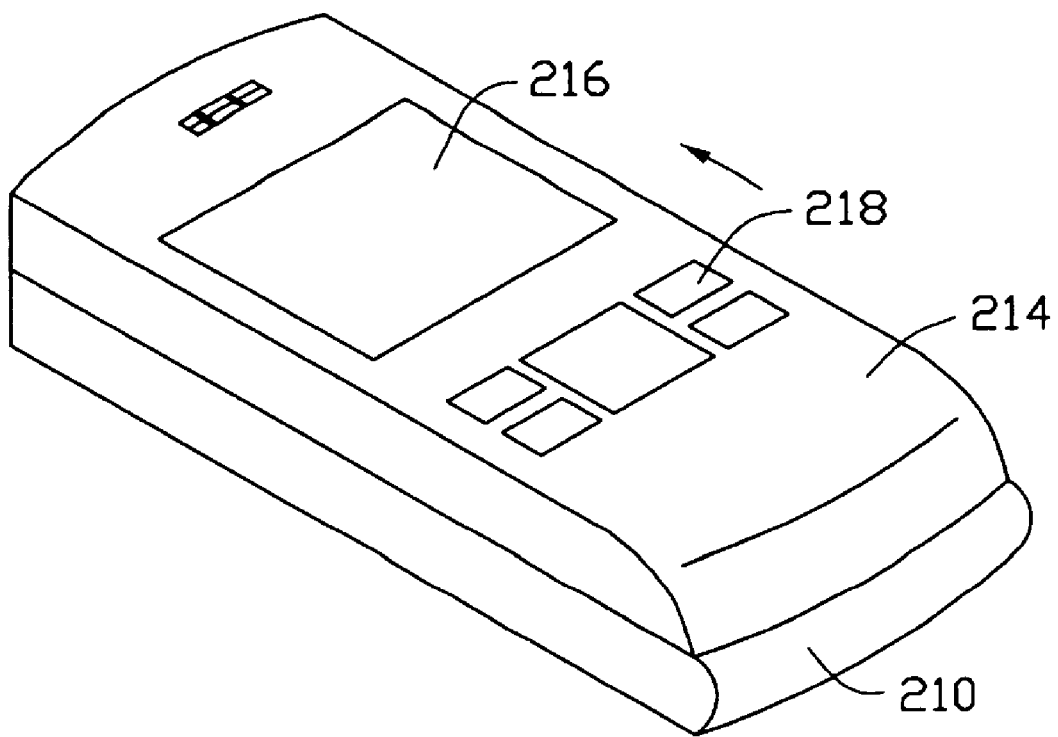
FIG. 1 is a perspective view illustrating a slide type mobile phone including a first housing and a second housing in a closed state, to which a slide mechanism according to a first preferred embodiment of the present invention is applied.
Figure 2:
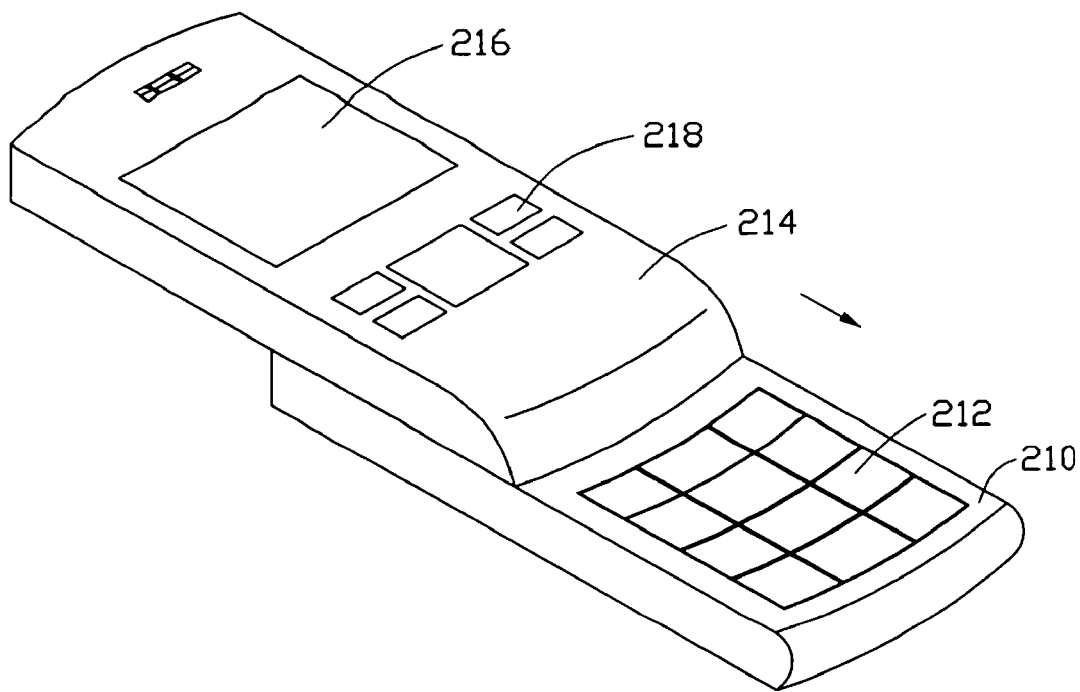
FIG. 2 is a perspective view illustrating the second housing of the slide type mobile phone illustrated in FIG. 1 in an opened state.

A slide mechanism according to a preferred embodiment of the present invention is adapted for use in slide type portable terminals such as a mobile phone 200. Referring to FIGS. 1 and 2, the mobile phone 200 includes a first housing 210, a second housing 214 engaged with the first housing 210 in a face-to-face relationship, and a slide mechanism 100 between the first and second housings 210 and 214 for generating an elastic force sufficient to slide the first and second housings 210 and 214 relative to one another between closed and open positions. The first housing 210 is provided, at a front surface thereof, with a keypad 212. The second housing 214 is provided, at a front surface thereof, with a display 216 and a plurality of function keys 218. The second housing 214 slides lengthwise over the first housing 210, thus exposing or covering the keypad 212.

Figure 3:
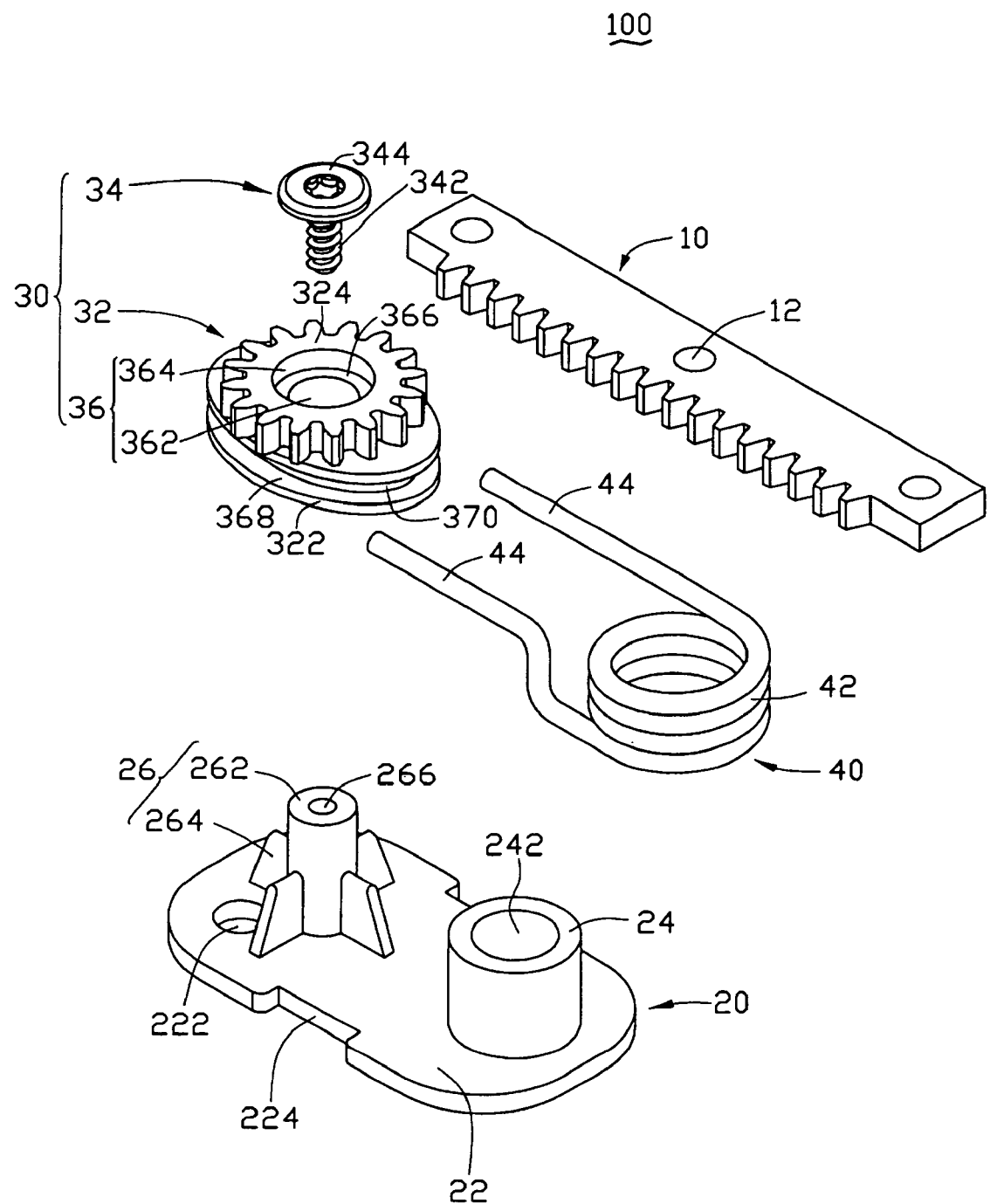
FIG. 3 is an exploded, perspective view of the sliding mechanism of FIG. 1, including a rack gear and a cam assembly.

Referring now to FIG. 3, the slide mechanism 100 includes a rack gear 10, a bracket 20, a cam assembly 30, and an elastic member 40. The rack gear 10 and the bracket 20 are respectively fixed with the second housing 214 and the first housing 210.

The rack gear 10 defines a plurality of first fixing holes 12 as a first securing portion, for fixing the rack gear 10 to the second housing 214.

The bracket 20 includes a mounting plate 22, a post 24 extending from a first surface of the mounting plate 22 upward, and a support 26. The mounting plate 22 defines a plurality of second fixing holes 222 as a second securing portion therein and two opposite notches 224 defined in opposite sides thereof. The second fixing holes 222 and notches 224 are configured for fixing the mounting plate 22 to the first housing 210. The post 24 defines a hole 242 extending thereof and communicating with one second fixing hole 222. The support 26 includes a fixing pole 262 extending vertically from the first surface of the mounting plate 22, and four supporting legs 264. The fixing pole 262 defines a screw hole 266 therein and communicating with one second fixing hole 222. The supporting legs 264 are symmetrically arranged around an outer circumferential of the fixing pole 262 and extend vertically from the first surface of the mounting plate 22 to a middle portion of the fixing pole 262.

The cam assembly 30 includes a cam 32, and a screw 34 as a fixing member. The cam 32 includes a holder 322 and a pinion gear 324 integrally formed with the holder 322. The cam 32 defines a step hole 36 extending therethrough. The step hole 36 includes a small diameter hole 362 defined in the holder 322, and a larger diameter hole 364 defined in the pinion gear 324, thus forming a step 366 between the holder 322 and the pinion gear 324. The step hole 36 is configured for receiving the fixing pole 262 of the mounting plate 22 therethrough. In this embodiment, the holder 322 is an elliptic cylinder, and has a non-circular peripheral groove such as an elliptic peripheral groove 368 defined in an outer circumferential surface portion thereof, thus forming an elliptic circumferential wall 370. The elliptic circumferential wall 370 includes a major axis portion and a minor axis portion. It is understood that the holder 322 may be other shaped and it is only required that the holder 322 have a non-circular cross-section portion.

The screw 34 includes a screw portion 342 for engaging in the screw hole 266 of the bracket 20, and a head 344 received in the large diameter hole 364 of the cam 32 and for facilitating the operation of the screw 34.

The elastic member 40 is a torsion spring. The elastic member 40 includes a coil portion 42, a first elastic arm 44, and a second elastic arm 46. An inner diameter of the coil portion 42 is slightly greater than or equal to an outer diameter of the protruding post 24 of the bracket 20 such that the coil portion 42 may be interferingly surrounding the protruding post 24 of the bracket 20. The first elastic arm 44 extends a predetermined distance from a first distal end of the coil portion 42 along a radial direction. The first and second elastic arms 44, 46 are arranged on a same side of the coil portion 42. The second elastic arm 46 extends from an opposite second distal end of the coil portion 41 along a radial direction, and is bent upward such that an end portion of the second elastic arm 46 is level with the first elastic arm 44. A length of the first and second elastic arms 44, 46 is equal to or greater than a distance between the fixing pole 262 and the protruding post 24 of the bracket 20.

Figure 4:
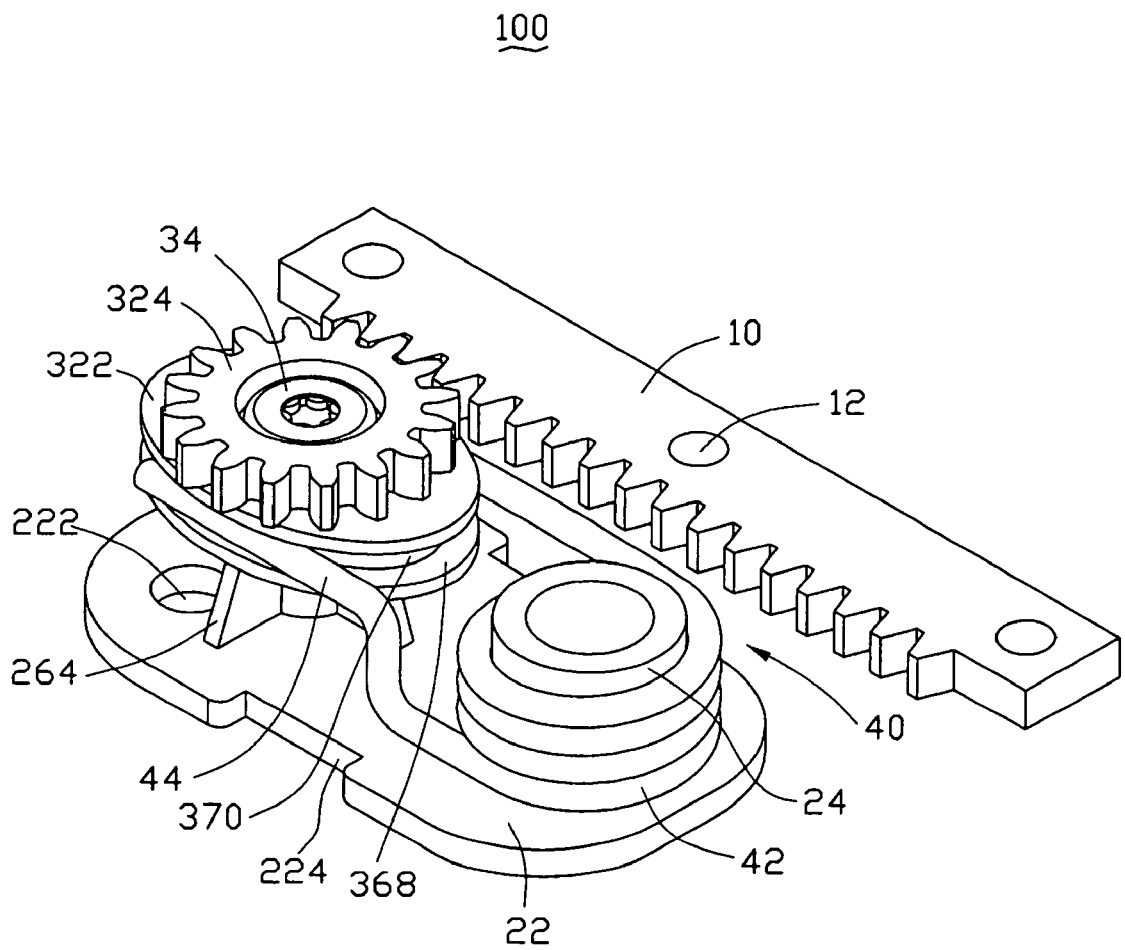
FIG. 4 is a perspective, assembled view of the sliding mechanism of FIG. 3.

Referring to FIG. 4, in assembly, the cam 32 surrounds the fixing pole 262 of the bracket 20, and supported by the supporting legs 264 of the bracket 20. The screw 34 is rotated into the screw hole 266 of the fixing pole 262 to axially secure the cam 32 on the fixing pole 262 of the bracket 20, with the head 344 of the screw 34 abutting the step 366 of the cam 32. The coil portion 42 of the elastic member 40 interferingly surrounds the protruding post 24 of the bracket 20 such that the elastic member 40 cannot separate from the bracket 20, with the two elastic arms 44 thereof received in the elliptic peripheral groove 368 and elastically abutting the elliptic circumferential wall 370 of the holder 322. Thus, the bracket 20, the cam assembly 30 and the elastic member 40 are combined together. The coil portion 42 of the elastic member 40 may be secured around the protruding post 24 by glue.

Figure 5:
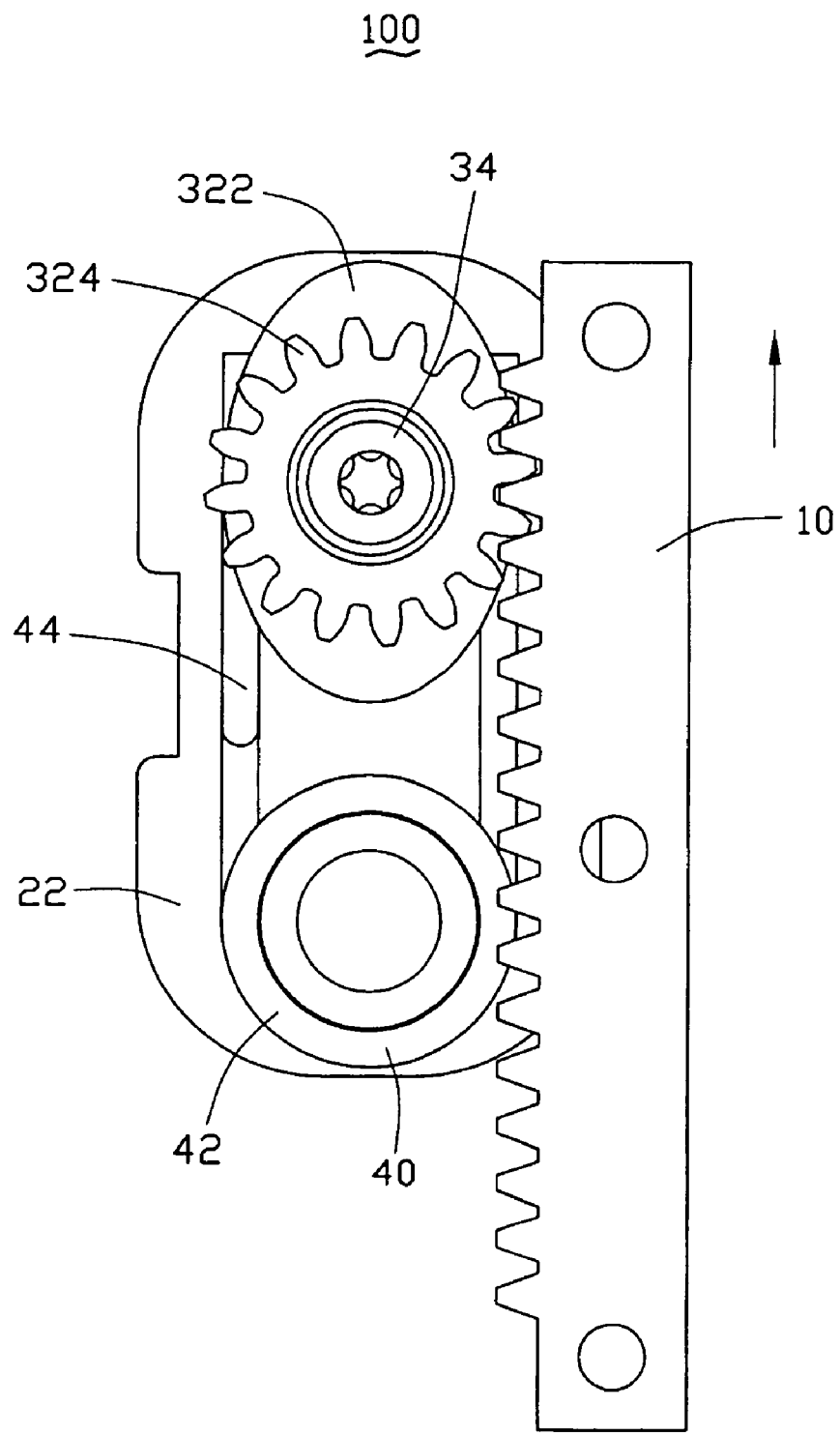
FIG. 5 is an explanatory view showing the rack gear being in a first position relative to the cam assembly, corresponding to a closed state of the second housing.

Referring to FIGS. 1-2 and FIG. 5, the rack gear 10 is fixed to the second housing 214 of the mobile phone 200 via the first fixing holes 12, and the combined bracket is fixed to the first housing 210 of the mobile phone 300 via the second fixing holes 222 and the notches 224. The second housing 214 is laid over the first housing 210, and the second housing 214 covers the keypad 212 of the first housing 210 as shown in FIG. 1. When the rack gear 10 is in a first position and the elastic arms 44 of the elastic member 40 are in an original state, abutting the minor axis portion of the elliptic circumferential wall 370 of the holder 322 of the cam 32. One end of the rack gear 10 can engages with the pinion gear 324 as shown in FIG. 5.

Figure 6:
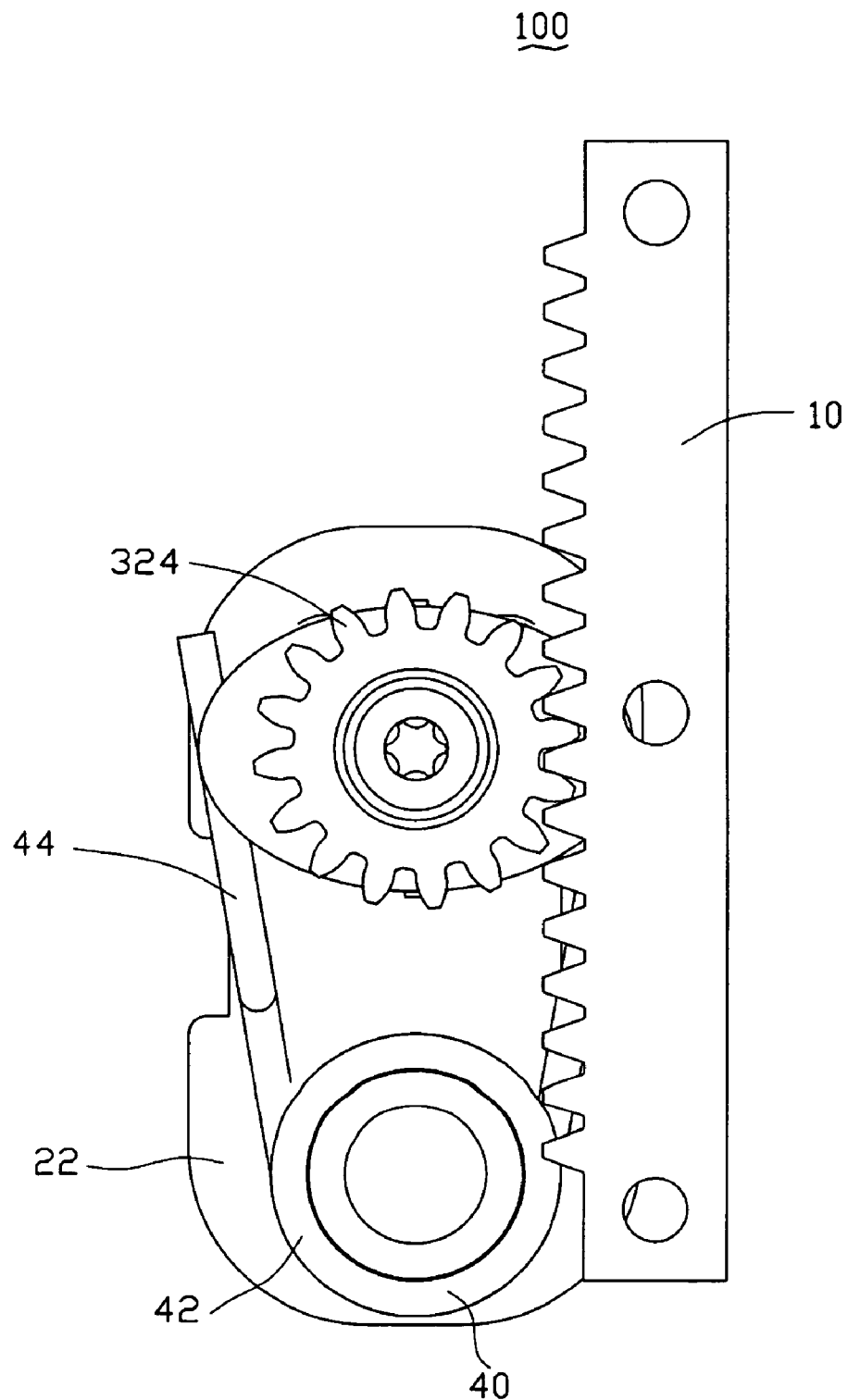
FIG. 6 is similar to FIG. 5, but showing the rack gear being in a second position relative to the cam assembly, corresponding to a half-closed state of the second housing.
Figure 7:
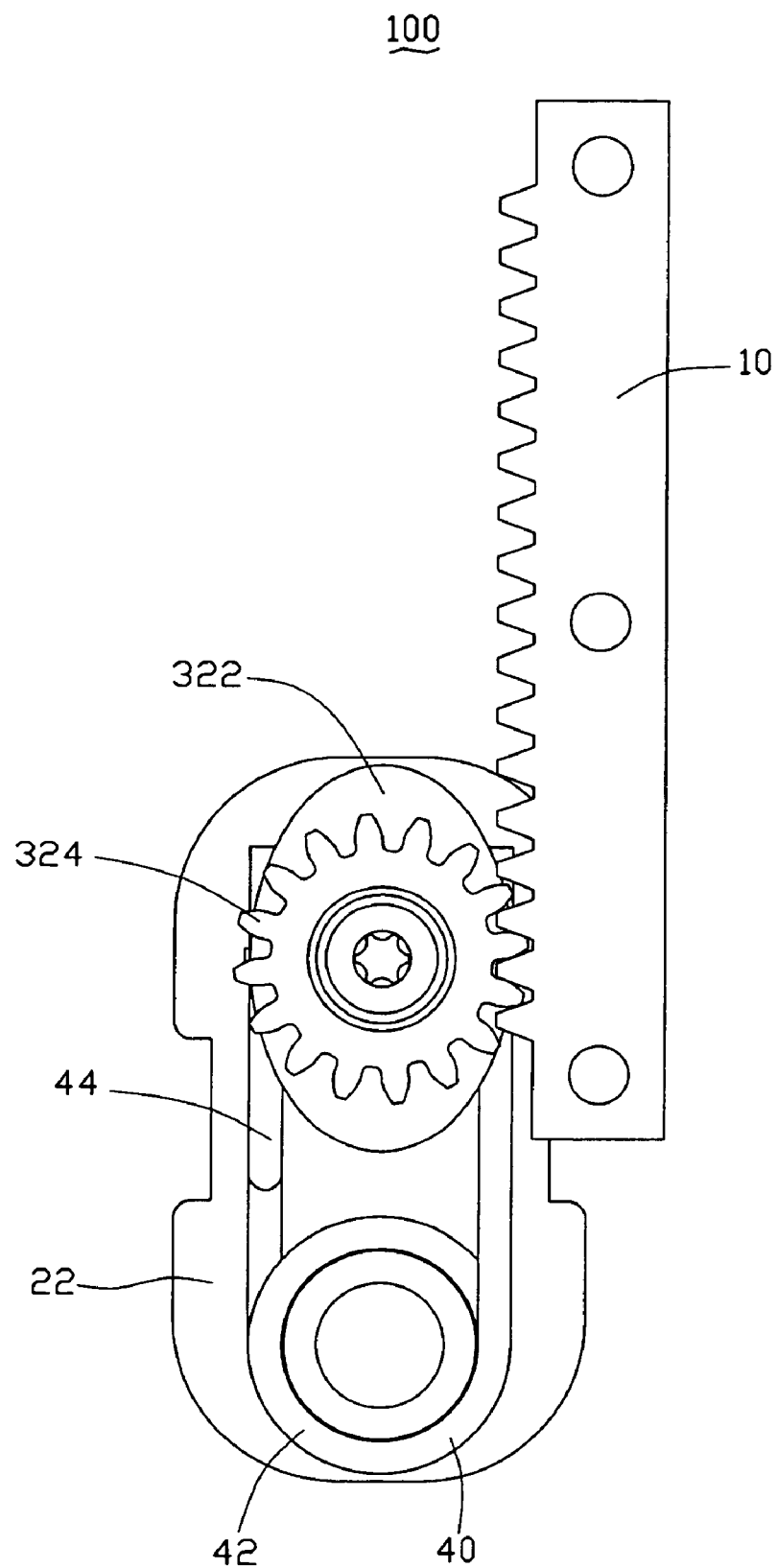
FIG. 7 is similar to FIG. 5, but showing the rack gear being in a third position relative to the cam assembly, corresponding to a closed state of the second housing.

Referring also to FIGS. 6-7, when the second housing 214 is pushed in a direction of the arrow shown in FIG. 1, that is toward an open position as shown in FIG. 7, in order for operating the keypad 212 of the first housing 210, the rack gear 10 linearly slides as indicated by a direction of the arrow shown in FIG. 5. Therefore, the pinion gear 324 engaged with the rack gear 10 is rotated, and the holder 322 integrally formed with the pinion gear 324 is rotated. Thus, the two elastic arms 44 of the elastic member 40 are deformed, thereby accumulating elastic force in opposition to the direction of movement until a major axis portion of the elliptic circumferential wall 370 is reached. When the cam 32 is rotated about 90 degrees as shown in FIG. 6, the rack gear 10 is in a second position, and the two elastic arms 44 of the elastic member 40 are at their most deformed, thereby storing a maximum elastic force centered on the holder 322. At this time, if the second housing 214 is pushed in either longitudinal direction, the elastic force is released in the direction of movement and the rack gear 10 has a tendency to slide under the influence of the elastic force of the two elastic arms 44 of the elastic member 40 to either the open position of FIG. 7 or the closed position of FIG. 5 corresponding to the direction of movement. If the movement continues in the direction as indicated by the arrow in FIG. 5, the second housing 214 is opened completely, relative to the first housing 210. In this state, the rack gear 10 is in a third position. Consequently, as shown in FIG. 2, the keypad 212 on the first housing 210 is exposed so as to allow operation. The process of closing the second housing 214 is simply the opening process of the second housing 214 in reverse.

In the embodiments described above, a main advantage of the slide mechanism 100 is that it has only four main components, and occupies a relatively small volume. Accordingly, the space required in an application such as a mobile phone 200 is reduced. In addition, the second housing 214 semi-automatically slides relative to the first housing 212 between the open and closed positions in response to the elastic force produced by the two elastic arms 44 of the elastic member 40. Therefore, a user can use the slide type portable terminal conveniently.

In alternative embodiment, the holder 324 may be column extending from the pinion gear 324 and rotatably surrounds the fixing pole 262 of the bracket 20. The first and second elastic arms 44, 46 of the elastic member 40 elastically respectively abut opposite sides of the non-circular cross-section portion of the column.

In further alternative embodiment, the elastic member 40 can be other spring such as a U-shaped spring. The U-shaped spring includes an arcuate portion interferingly surrounding the protruding post of the bracket, the two elastic arms extending from two distal ends of the arcuate portion along a radial direction.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A slide mechanism, comprising:
   a rack gear;
   a bracket;
   a cam assembly rotatably mounted on the bracket, the cam assembly including a pinion gear and a holder, the pinion gear gear-coupled to the rack gear, the holder defining an elliptical peripheral groove in an outer circumferential surface portion thereof; and an elastic member secured on the bracket for providing an elastic force to the pinion gear, the elastic member including two spaced elastic arms located at two opposite sides of the holder and engagingly received in the elliptical peripheral groove of the holder.

2. The slide mechanism as claimed in claim 1, wherein the holder is non-rotatable relative to the pinion gear.

3. The slide mechanism as claimed in claim 1, wherein the elastic member is a torsion spring.

4. The slide mechanism as claimed in claim 2, wherein the holder is an elliptical cylinder integrally forming the pinion gear.

5. The slide mechanism as claimed in claim 3, wherein the bracket comprises a mounting plate, a protruding post extending from the mounting plate, and a support extending from the mounting plate, the protruding post being spaced apart from the support.

6. The slide mechanism as claimed in claim 5, wherein the elastic member further comprises a coil portion interferingly surrounds the protruding post of the bracket, the elastic arms extending from two distal ends of the coil portion along a radial direction.

7. The slide mechanism as claimed in claim 5, wherein the support comprises a fixing pole, and the cam defines a step hole running through the holder and the pinion gear, the step hole rotatably receiving the fixing pole.

8. The slide mechanism as claimed in claim 7, wherein the support further comprises a plurality of supporting legs symmetrically arranged around an outer circumferential of the fixing pole and extending vertically from the first surface of the mounting plate, the supporting legs being configured for supporting the cam assembly.

9. The slide mechanism as claimed in claim 7, wherein the cam assembly further comprises a fixing member fixed to the fixing pole.

10. The slide mechanism as claimed in claim 9, wherein the fixing member is a screw.

11. A slide mechanism, comprising:
a rack gear;
a bracket;
a cam rotatably mounted on the bracket, the cam including an elliptically-shaped holder and a pinion gear rotating with the holder, the pinion gear engaging with the rack gear; and
an elastic member secured on the bracket, the elastic member including two elastic arms elastically abutting two opposite sides of the elliptical holder, wherein the holder defines an elliptical peripheral groove in an outer circumferential surface portion thereof, the elastic arms located at two opposite sides of the holder and engagingly received in the elliptical peripheral groove of the holder.

12. The slide mechanism as claimed in claim 11, wherein the bracket comprises a mounting plate, and protruding post extending from the mounting plate, and the elastic member further comprises a coil portion interferingly surrounding the protruding post of the bracket, the elastic arms extending from two distal ends of the coil portion along a radial direction.

13. The slide mechanism as claimed in claim 11, wherein the bracket comprises a mounting plate, and protruding post extending from the mounting plate, and the elastic member is a substantially U-shaped spring, and includes an arcuate portion interferingly surrounding the protruding post of the bracket, the two elastic arms extending from two distal ends of the arcuate portion along a radial direction.

14. The slide mechanism as claimed in claim 11, wherein the bracket comprises a mounting plate, and a fixing pole extending from the mounting plate, and the cam defining a hole extending through the holder and the pinion gear, the hole rotatably receiving the fixing pole.

15. A slide-type portable terminal device, comprising:
a first housing;
a second housing slidably installed on the first housing; and
a slide mechanism installed between the first housing and the second housing for guiding a sliding motion of the second housing in relation to the first housing, comprising:
a rack gear having a plurality of securing portions for fixing the rack gear to one of the first housing and the second housing;
a bracket having a plurality of securing portion for fixing the rack gear to other one of the first housing and the second housing;
a cam rotatably mounted on the bracket, the cam including an elliptically-shaped holder and a pinion gear rotating with the holder, the pinion gear engaging with the rack gear; and
an elastic member secured on the bracket, the elastic member including two elastic arms elastically abutting two opposite sides of the elliptical holder wherein the holder defines an elliptical peripheral groove in an outer circumferential surface portion thereof, the elastic arms being located at two opposite sides of the holder and abuttingly received in the elliptical peripheral groove of the holder.

16. The slide-type portable terminal device as claimed in claim 15, wherein the holder is an elliptical cylinder integrally formed with the pinion gear.

* * * * *